US006035730A

United States Patent [19]

Kawase

[11] Patent Number: 6,035,730

[45] Date of Patent: Mar. 14, 2000

[54] APPARATUS FOR CHECKING GROMMETS

[75] Inventor: Kiyotaka Kawase, Yokkaichi, Japan

[73] Assignee: Sumitomo Wiring Systems, Ltd., Japan

[21] Appl. No.: 09/054,781

[22] Filed: Apr. 3, 1998

Related U.S. Application Data

[62] Division of application No. 08/618,063, Mar. 25, 1996, Pat. No. 5,777,274.

[30] Foreign Application Priority Data

Mar. 28, 1995 [JP] Japan .................................... 7-69871

[51] Int. Cl.[7] .................................... H01B 17/26

[52] U.S. Cl. .................................... 73/865.9

[58] Field of Search .................... 73/865.9; 340/678; 174/153 G; 29/407.1

[56] References Cited

U.S. PATENT DOCUMENTS

| | | |
|---|---|---|
| 3,857,136 | 12/1974 | Dean . |
| 4,959,509 | 9/1990 | Takeuchi et al. . |
| 5,453,579 | 9/1995 | Cohea . |
| 5,504,973 | 4/1996 | Kameyama . |

FOREIGN PATENT DOCUMENTS

| | | |
|---|---|---|
| 0 580 130 A1 | 1/1994 | European Pat. Off. . |
| 0 595 687 A1 | 5/1994 | European Pat. Off. . |
| 42 43 557 A1 | 6/1994 | Germany . |
| 880376 | 10/1961 | United Kingdom . |

*Primary Examiner*—Robert Raevis
*Attorney, Agent, or Firm*—Anthony J. Casella; Gerald E. Hespos

[57] ABSTRACT

A grommet 11 includes a vehicle body mount portion 11*a* to be mounted on a panel of a vehicle body and a wire insertion portion 11*b* to be mounted on a wiring harness. A checking projection 11*c* is formed in a desired position on an outer surface of the vehicle body mount portion 11*b* of the grommet. The grommet 11 may be used with a checking device 10 formed with a grommet receptacle 10*b* and a checking recess 10*e* in which the checking projection 11*c* is to be fitted for checking whether the grommet is of a specified shape.

4 Claims, 8 Drawing Sheets

APPARATUS FOR CHECKING GROMMETS

This application is a divisional, of U.S. patent application Ser. No. 08/618,063 filed Mar. 25, 1996, now U.S. Pat. No. 5,777,274.

BACKGROUND OF THE INVENTION

1. Field of the Invention

The present invention relates to a grommet and a grommet checking apparatus. Particularly, the present invention is designed to accurately check whether or not a grommet of specified shape is mounted on a wiring harness.

2. Description of the Prior Art

When a wiring harness is mounted in a vehicle through a through hole formed in a panel of a vehicle body or the like, a grommet 1 of rubber shown in FIG. 13 is fitted in the through hole with the wiring harness inserted through the grommet 1 for waterproof, dustproof and soundproof purposes. The grommet 1 includes a vehicle body mount portion 1*a* having a tapered shape and a cylindrical wire insertion portion 1*b* continuous with a small diameter end of the vehicle body mount portion 1*a*.

The size and shape of the vehicle body mount portion 1*a* of the grommet 1 are set such that the mount portion 1*a* is fitted and held in the through hole of the vehicle body panel. No problem arises when a proper or specified grommet is mounted on the wiring harness. However, when an improper or nonspecified grommet is mounted on the wiring harness, the mount portion 1*a* cannot be fitted and held in the through hole of the vehicle body panel. If the mounted grommet is smaller than the proper grommet, waterproof performance and other performances are reduced. On the other hand, if the mounted grommet is larger than the proper grommet, it cannot be mounted on the vehicle body panel.

Accordingly, it is necessary to check whether or not a grommet of specified shape is mounted on the wiring harness. Checking has been conducted by the use of a checking device 2 as shown in FIGS. 14(A) and 14(B). The checking device 2 is formed with a recess acting as a grommet receptacle 2*a*. The shape of the grommet receptacle 2*a* differs depending upon the shape of the grommet 1. The grommet receptacle 2*a* includes a groove 2*b* in which the vehicle body mount portion 1*a* which is the lower half of the grommet 1 of specified shape is to be fitted, and a groove 2*c* in which the wire insertion portion 1*b* is to be fitted. A button 3 of a detection switch projects at the bottom surface of the groove 2*b*.

When the grommet 1 mounted with the wiring harness W/H is fitted in the grooves 2*b*, 2*c* of the receptacle 2*a* of the checking device 2 as shown in FIG. 15, a rim 1*d* of the vehicle body mount portion 1*a* of the grommet 1 presses the button 3 of the detection switch as shown in FIGS. 16(A) and 16(B). When a grommet 1 of nonspecified shape is fitted in the grooves 2*b*, 2*c*, the button 3 is not pressed, with the result that the mounting of the improperly shaped grommet on the wiring harness can be detected.

In the above checking device 2, as shown in FIGS. 17(A) and 17(B), even when a similarly shaped grommet 1' having a vehicle body mount portion 1*a'* whose diameter D is smaller than that of the vehicle body mount portion 1*a* of the specified grommet 1 is fitted in the groove 2*b*, the button 3 of the detection switch may be pressed upon contact of a rim 1*d'* of the vehicle body mount portion 1*a'* with the bottom surface of the groove 2*b*. Thus, the prior art checking device 2 may detect whether or not the grommet is mounted on the wiring harness, but cannot check whether or not the grommet 1 of specified shape is mounted.

In view of the above problem, an object of the invention is to provide a grommet and a grommet checking device for securely checking whether or not a grommet of specified shape is mounted on a wiring harness, including distinguishing amongst a plurality of kinds of grommets of different shapes, particularly having differently shaped vehicle body mount portions.

SUMMARY OF THE INVENTION

According to the invention, there is provided a grommet comprising a mount portion for mounting the grommet on an external structure, a wire insertion portion to insert a wiring harness therethrough, and at least one identifying portion of the grommet, preferably formed on an outer surface thereof. The identifying portion may be in form of a projection and/or recess on the outer surface of the grommet or may comprise an electromagnetic element e.g. a disc, a lamina or a platen imbedded in the material or laminated onto the surface of the grommet.

According to a preferred embodiment, the shape and/or location on the grommet and/or the number of the at least one identifying portion functions to identify the type, in particular size, shape, specifications, waterproofness, heatproofness, heat resistance, etc. of the grommet.

Further preferably, the identifying portion is formed in a position on the grommet different from a contact portion of the mount portion being connectable to the external structure, wherein the identifying portion preferably comprises a checking projection and/or a checking recess.

Further preferably, the identifying portion comprises a polygonal or circular flange, which may be a rim of the mount portion or which project from the rim.

According to the invention, there is further provided a grommet checking apparatus comprising: a grommet receptacle having a shape at least partly mating with the outer shape of a grommet according to the invention; and at least one identification portion for the identification of the grommet insertable into the grommet receptacle.

According to a preferred embodiment, the identification portion comprises a checking recess and/or a checking projection, in particular mating the identifying portion of the grommet insertable in the grommet receptacle.

Preferably, the grommet checking apparatus further comprises a detection means for detecting the identifying portion, in particular the checking projection and/or checking recess, of the grommet insertable in the grommet receptacle, wherein the detection means projects in particular into the identification portion, wherein the detection means preferably outputs a control signal upon engagement of the identifying portion with the identification portion.

Further preferably, the identification portion is so formed as to communicate with a mount portion fitting groove of the grommet receptacle.

According to an embodiment of the invention, the grommet comprises a large diameter vehicle body mount portion which is to be inserted into a through hole formed in a panel of a vehicle body and to be securely mounted therein; a small diameter wire insertion portion continuously formed with one end of the vehicle body mount portion to insert a wiring harness therethrough; and a checking projection formed on an outer surface of the vehicle body mount portion, the position of the checking projection differing depending upon the shape of the grommet.

The checking projection may be formed by a polygonal flange projecting from the outer periphery of the vehicle body mount portion having a circular cross section.

As is clear from the above description, by forming the checking projection in any desired position on the outer surface of the vehicle body mount portion, whether or not the grommet mount on a specified wiring harness is of specified shape can be accurately detected.

Further, according to a preferred embodiment, there is provided a grommet checking device for a grommet mounted on a wiring harness. The grommet comprises a large diameter vehicle body mount portion which is to be inserted into a through hole formed in a panel of a vehicle body and to be securely mounted therein, and a small diameter wire insertion portion continuously formed with one end of the vehicle body mount portion to insert a wiring harness therethrough. The grommet is to be fitted in a grommet receptacle of the checking device to check whether or not a grommet of specified shape is mounted. The checking device comprises a checking recess so formed as to communicate with a vehicle body mount portion fitting groove of the grommet receptacle of the checking device. A detection switch projects into the checking recess. When a grommet comprising a checking projection formed on an outer surface of the vehicle body mount portion is inserted into the grommet receptacle of the checking device, the detection switch is turned on upon engagement of the checking projection with the checking recess. The mounted grommet is detected to be nonspecified when the detection switch remains off.

The detection switch may preferably be connected with an indicator for indicating that a proper grommet is mounted on the wiring harness, when the button of the detection switch is pressed. The indicator may indicate that an improper grommet is mounted, when the switch is off.

By checking the above grommet by means of the above checking apparatus, the button of the detection switch is pressed only when the checking projection formed on the outer surface of the vehicle body mount portion of the grommet is fitted in the checking recess formed in the checking device. More specifically, the checking projection of the grommet is formed in a different position for each shape of the grommet, and the position of the checking recess of the checking device is changed so as to conform to the position of the checking projection. Accordingly, even if a grommet of nonspecified shape is fitted in the receptacle of the checking device, the mounting of the improperly shaped grommet can be securely detected since the checking projection cannot be fitted in the checking recess.

Accordingly, checking is conducted by fitting the grommet formed with the checking projection in the grommet receptacle of the checking device formed with the checking recess in a position corresponding to the position of the checking projection. Only the checking projection of the specified grommet can be fitted in the checking recess. Since the checking projection of the nonspecified grommet cannot be fitted into the checking recess, the button of the detection switch provided in the checking recess cannot be pressed. Thus, whether or not the grommet mounted on the wiring harness is of specified shape can be accurately checked.

In the case that the grommet is formed with two or more checking projections in spaced apart positions, the checking device is preferably formed with two or more checking recesses in positions corresponding to the checking projections, and the detection switch preferably projects into each corresponding checking recess.

In the case that the grommet is formed with two or more checking projections and the checking device is formed with two or more checking recesses each fitted with the button of the detection switch, even if the grommet of nonspecified shape is forcibly fitted in the grommet receptacle, all the buttons in the checking recesses are not simultaneously pressed. Thus, an erroneous mounting of the grommet can be securely detected.

Accordingly, two or more checking projections formed on the grommet are fitted in the corresponding checking recesses of the checking device. No indication is made by the indicator unless the checking projections press the buttons of all the detection switches to turn them on. Thus, whether or not the grommet is of specified shape can be more securely detected.

DETAILED DESCRIPTION OF THE PREFERRED EMBODIMENT

FIGS. 1 to 6 show a grommet checking device 10 according to a first embodiment of the invention. The grommet 11 includes a vehicle body mount portion 11*a* to be mounted on a vehicle body and a wire insertion portion 11*b* through which a wiring harness W/H comprising a plurality of wires is inserted. The checking device 10 is used in an apparatus for checking whether or not a grommet 11 of specified shape is mounted on a wiring harness W/H.

Figure 1:
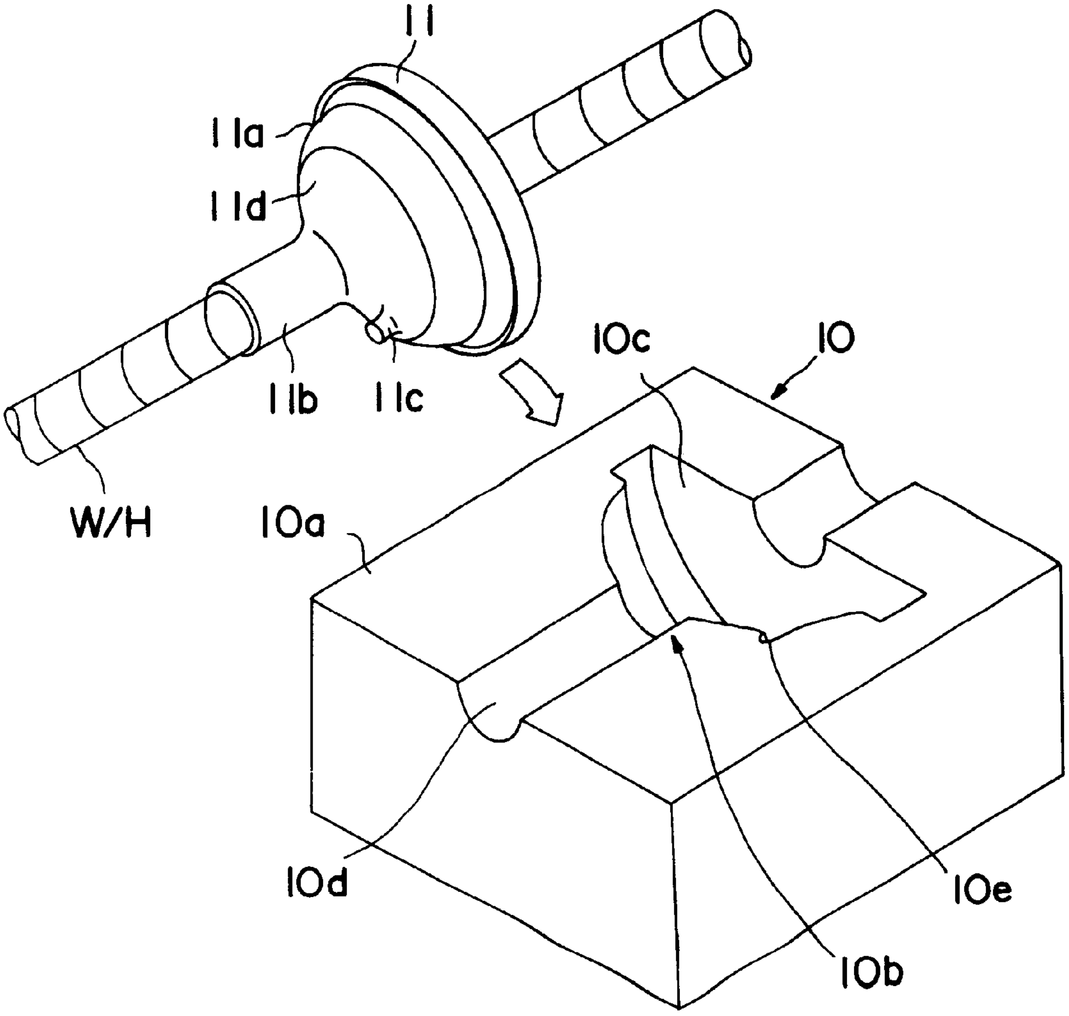
FIG. 1 is a perspective view of a grommet checking device according to a first embodiment of the invention and a grommet through which a wiring harness is inserted and which is to be fitted in the grommet checking device.
Figure 2:
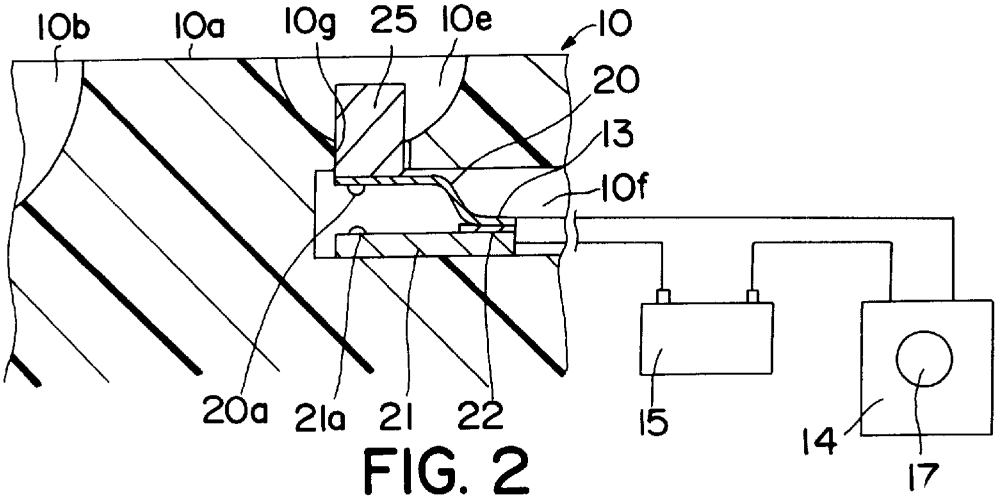
FIG. 2 is a partial section of a checking device.
Figure 3:
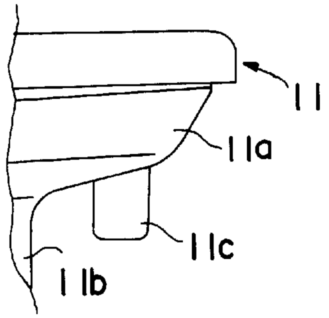
FIG. 3 is a plan view of an essential portion of the grommet.
Figure 4A:
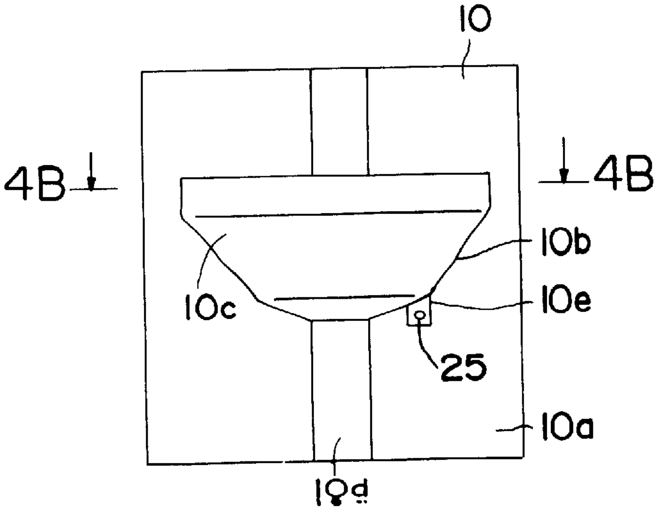
FIG. 4(A) is a plan view of the checking device.
Figure 4B:
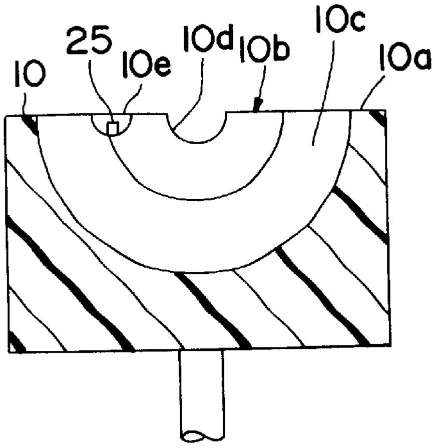
FIG. 4(B) is a cross-sectional view taken along line 4B—4B in FIG. 4(A), FIGS. 5(A) and 5(B) are plan and sectional views showing a state where a grommet of specified shape is fitted in the checking device.

In the checking apparatus, a detection switch 13 mounted in the checking device 10 and an indicator 14 including a lamp 17 (or other control devices) which is turned on when the detection switch 13 is turned on are electrically connected via a power source 15 and a wire as shown in FIG. 2.

The shape of the grommet 11 differs depending upon the size or thickness of the wiring harness inserted therethrough and the size of a through hole formed in a panel of a vehicle body in which the wiring harness is to be mounted. Particularly, the shape differs in the portion of the vehicle body mount portion 11*a* which is engaged with the edge of the through hole formed in the panel. A plurality of kinds of grommets 11 of different shapes are to be used. Each grommet 11 has a checking projection 11*c* projecting from an outer surface of the vehicle body mount portion 11*a*. The position of the checking projections 11*c* differs depending upon the shape of the grommet 11. The checking projection 11*c* of the first embodiment has a cylindrical shape and projects toward or extends parallel to the wire insertion portion 11*b* in a substantially middle position of a tapered surface lid of the vehicle body mount portion 11*a*.

On the other hand, there are a plurality of checking devices 10 corresponding to a plurality of kinds of grommets 11 of different shapes. An upper surface 10*a* of the checking device 10 is recessed to form a grommet receptacle 10*b*. The shape of the grommet receptacle 10*b* is in conformity with that of the grommet 11 and has a semicircular cross section. The grommet receptacle 10*b* includes a groove 10*c* in which the bottom half of the vehicle body mount portion 11*a* is to be fitted and a groove 10*d* in which the bottom half of the wire insertion portion 11*b* is to be fitted. The groove 10*c* is formed with a checking recess 10*e* in a position corresponding to the checking projection 11*c* of the grommet 11. A mount hole 10*f* for mounting the detection switch 13 is in communication with an inner side of the checking recess 10*e* as shown in FIG. 2.

The checking recess 10*e* has a semicylindrical shape and is formed in its bottom center with an insertion hole 10*g* communicating with the mount hole 10*f*.

As shown in FIG. 2, the detection switch 13 is such that a resilient movable contact portion 20 and a fixed contact portion 21 are connected via an insulating member 22. A button 25 is secured on the upper surface of the movable contact 20. The button 25 projects into the checking recess 10*e* through the insertion hole 10*g*. The movable contact portion 20 is connected with the indicator 14 via a wire, whereas the fixed contact portion 21 is connected with a power supply 15 via a wire. The power supply 15 and the indicator 14 are also connected via a wire.

Figure 5A:
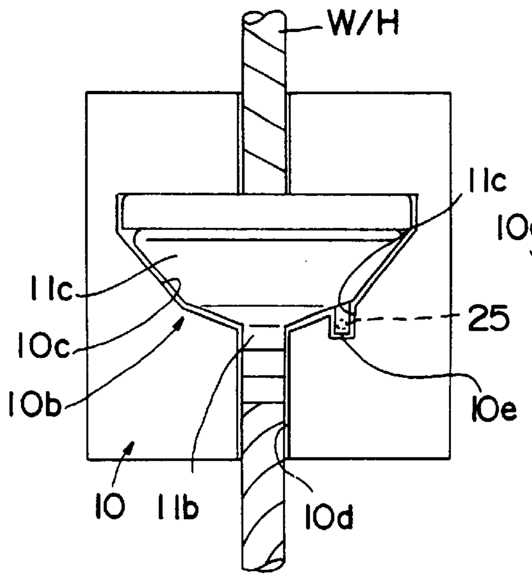
FIG. 5(C) is a section of an essential portion of FIG. 5(A), FIG. 6 A) is a plan view showing a state, where a grommet according to a further embodiment is fitted in a checking device.
Figure 5B:
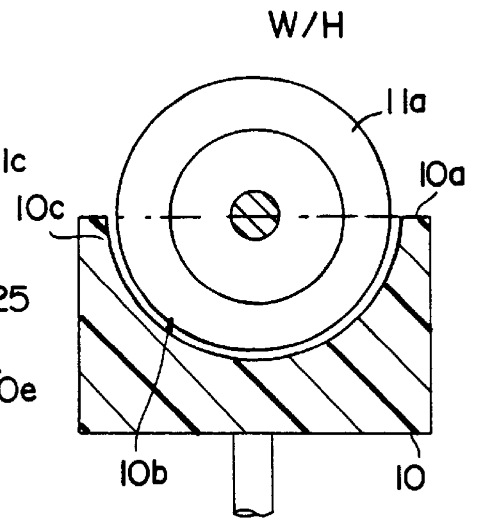
Figure 5C:
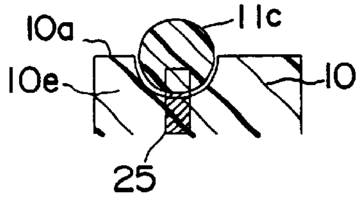

When a grommet 11 of specified shape is mounted on the wiring harness W/H to be arranged in the vehicle, upon insertion of the grommet 11 into the grommet receptacle 10*b* of the checking device 10, the bottom half of the grommet 11 is stably accommodated in the grommet receptacle 10*b* as shown in FIGS. 5(A) and 5(B) and the checking projection 11*c* is fitted in the checking recess 10*e* as shown in FIG. 5(C).

Accordingly, the checking projection 11*c* presses the button 25 of the detection switch 13 down, causing the movable contact portion 20 to move downwardly. Thereby, contacts 20*a*, 21*a* of the contact portions 20, 21 are brought into contact to establish an electrical connection, with the result that the lamp 17 of the indicator 14 is turned on. Thus, an operator can visually confirm that the properly shaped grommet 11 is mounted on the wiring harness W/H.

Figure 6A:
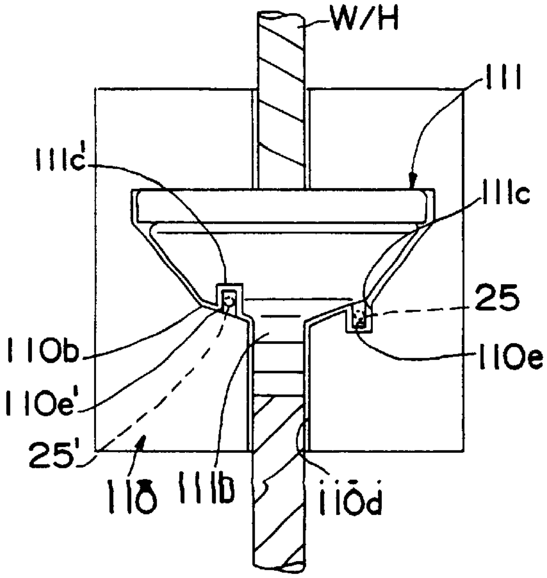
FIG. 6(B) is a plan view showing a state where a grommet of nonspecified shape is fitted in the checking device.

FIG. 6(A) shows a grommet 111 according to a further embodiment fitted in to the grommet receptacle 110*b* of the checking device 110. As in FIGS. 5(A) and 5(B) the bottom half of the grommet 111 of FIG. 6(A) is stably accommodated in the grommet receptacle 110*b* with the checking projection 111C of the grommet 111 fitted in the checking recess 110*e* of the checking device 110. A checking projection 110*e*′ alternatively or additionally provided on the grommet checking device 110 is fitted in a checking recess 111*c*′ alternatively or additionally provided on the grommet 111.

Accordingly, if a grommet without a recess 111*c*′ is placed in the checking device 110 the checking projection 110*e*′ may press down a button 25' of a detection switch corresponding to the button 25 of the embodiment shown in FIGS. 5(A) and 5(B). This will cause a movable contact portion to move downwardly. Thereby, contacts of the contact portions are brought into contact to establish an electrical connection, with the result that a lamp of the indicator 14 is turned on. Thus, an operator can visually confirm that the improperly shaped grommet 111 is mounted on the wiring harness W/H.

Figure 6B:
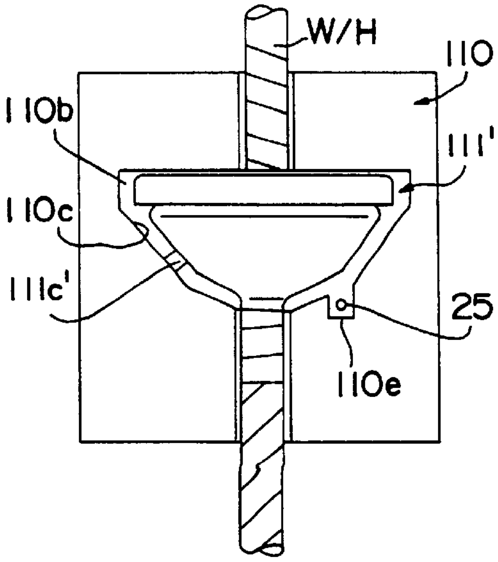

On the other hand, when a grommet 111' of nonspecified shape is mounted on the wiring harness W/H, the grommet 111' may be accommodated in the grommet receptacle 110*b* as shown in FIG. 6(B). However, since the position of a checking projection 111*c*′ of the grommet 111' does not conform to the position of the checking recess 110*e*, the checking projection 111*c*′ cannot press the button 25 of the detection switch 13. Accordingly, the lamp 17 of the indicator 14 is not turned on and the operator can visually conform that the improperly shaped grommet 111' is mounted on the wiring harness W/H.

FIGS. 7 to 9 show modifications of the first embodiment.

Figure 7A:
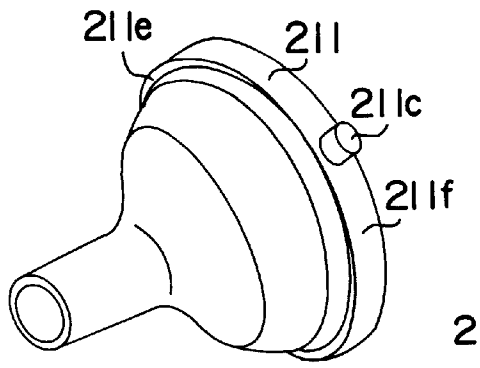
FIGS. 7(A) and 7(B) show a modification of the first embodiment, FIG. 7(A) being a perspective view of the grommet and FIG. 7(B) a section of the checking device.
Figure 7B:
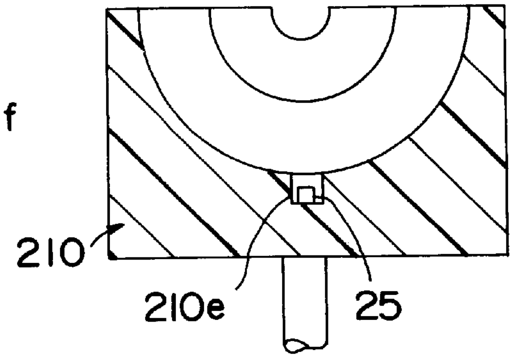

In a modification shown in FIGS. 7(A) and 7(B), the checking projection 211*c* of a grommet 211 radially projects from a rim 211*f* on the outside of an engaging groove 211*e* to be engaged with the panel of the vehicle body. Further, the checking recess 210*e* of the checking device 210 is formed in such a position as to face the checking projection 211*c*, and the button 25 of the detection switch 13 projects into the checking recess 210*e*.

Figure 8A:
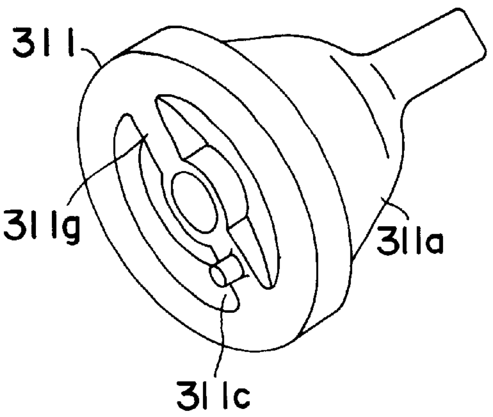
FIGS. 8(A) and 8(B) show another modification of the first embodiment, FIG. 8(A) being a perspective view of the grommet and FIG. 8(B) a section of the checking device.
Figure 8B:
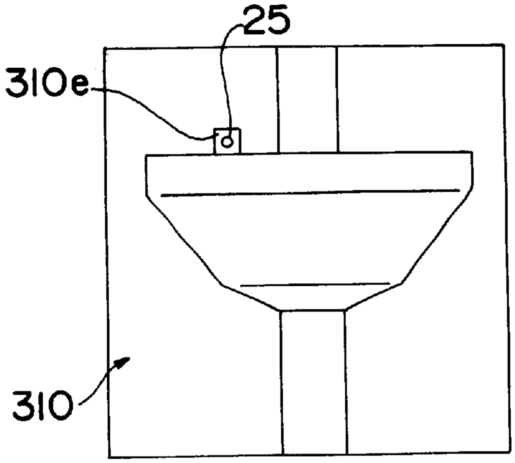

In a modification shown in FIGS. 8(A) and 8(B), the grommet 311 is formed with a reinforcing rib 311*g* inside the vehicle body mount portion 311*a*, and the checking projection 311*c* projects outward from the end face of the rib 311*g*. On the other hand, the checking recess 310*e* of the checking device 10 is formed in such a position as to face the checking projection 311*c*. The button 25 of the detection switch 13 projects into the checking recess 310*e*.

Figure 9A:
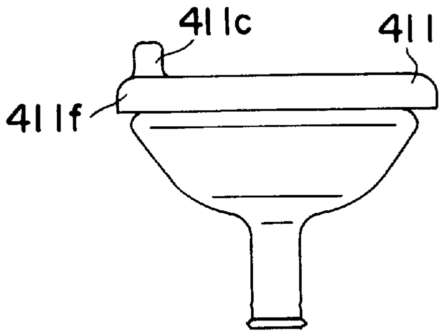
FIGS. 9(A) and 9(B) show still another modification of the first embodiment, FIG. 9(A) being a perspective view of the grommet and FIG. 9(B) a section of the checking device.
Figure 9B:
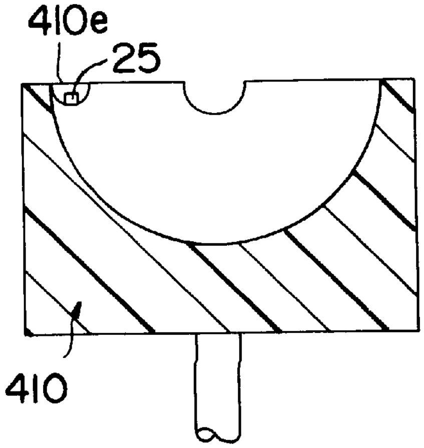

In a modification shown in FIGS. 9(A) and 9(B), the checking projection 411*c* of the grommet 411 projects outward from the end face of the rim 411*f*, and the checking recess 410*e* is formed in the upper surface of the checking device 410.

The modifications are not limited to the above, but any modification is possible as long as the checking projection projects from the outer surface of the vehicle body mount portion of the grommet other than from a lip of the end face of the rim on the side of the engaging groove. If the checking projection is formed on the lip, the vehicle body mount portion cannot be mounted in close contact with the edge of the through hole formed in the panel of the vehicle body, thereby damaging a waterproof performance.

Figure 10A:
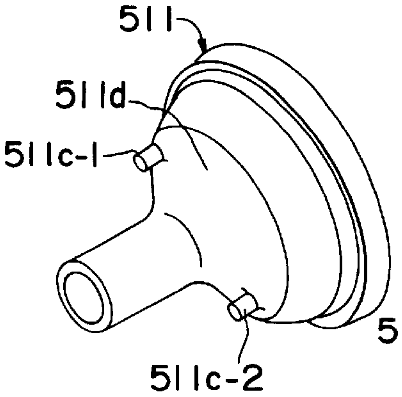
FIGS. 10(A) and 10(B) show a second embodiment, FIG. 10(A) being a perspective view of a grommet and FIG. 10(B) a section of a checking device.
Figure 10B:
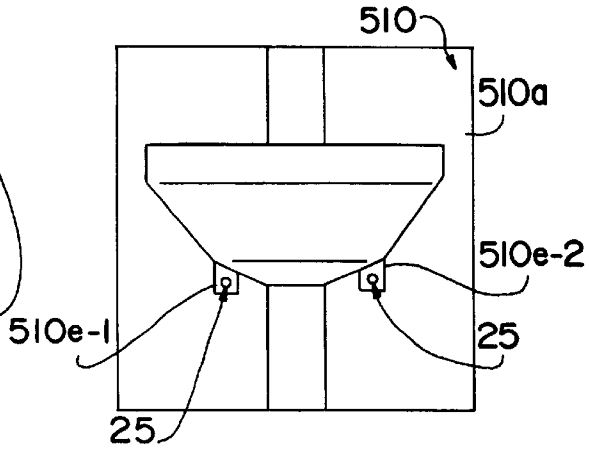

FIGS. 10(A) and 10(B) show a grommet 511 and a grommet checking device 510 according to a second embodiment. In the second embodiment, two each of checking projections 511*c*-1, 511*c*-2 and checking recesses 510*e*-1, 510*e*-2 are formed in the grommet 511 and the checking device 510, respectively.

Checking projections 511*c*-1, 511*c*-2 project from a substantially middle portion of a tapered surface 511*d* of the grommet 511 such that they are opposed to each other in a radius direction of the grommet 511.

Checking recesses 510*e*-1, 510*e*-2 are formed in an upper surface 510*a* of the checking device 510. Similar to the first embodiment, a button 25 projecting from a movable contact portion 20 of a detection switch 13 projects into the corresponding one of the checking recesses 510*e*-1, 510*e*-2. A lamp 17 of an indicator 14 is turned on when two detection switches 13 are both turned on.

In the second embodiment, even if an improperly shaped grommet is forcibly fitted in a grommet receptacle 510*b*, the checking projections cannot be fitted in the checking recesses 510*e*-1, 510*e*-2. Thus, an erroneous mounting of a grommet can be more securely detected.

Figure 11A:
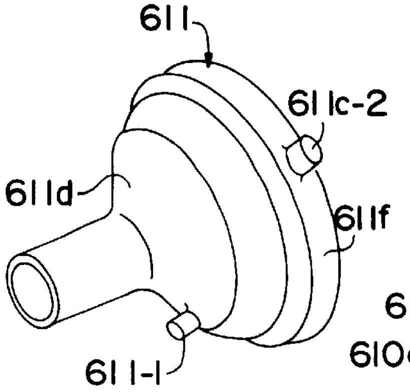
FIGS. 11(A) and 11(B) show a modification of the second embodiment, FIG. 11(A) being a perspective view of the grommet and FIG. 11(B) a section of the checking device.
Figure 11B:
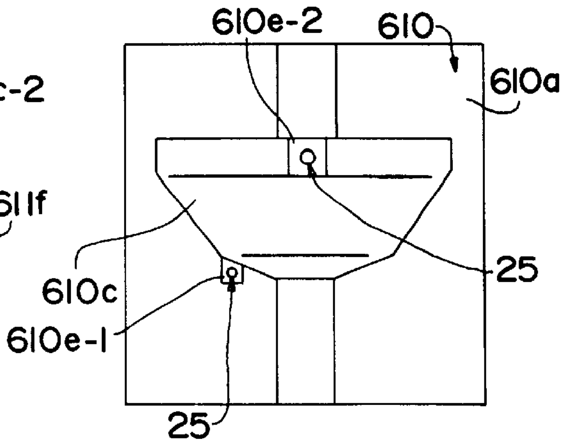

FIGS. 11(A) and 11(B) show a modification of the second embodiment. One checking projection 611*c*-1 of the grommet 611 projects from a substantially middle portion of the tapered surface 611*d*, whereas the other checking projection 611*c*-2 projects from the outer circumferential surface of the rim 611*f*. In this modification, the checking projections 611*c*-1, 611*c*-2 are displaced by 45° in a circumferential direction. Further, the checking recess 610*e*-1 corresponding to the checking projection 611*c*-1 is formed in the upper surface 610*a* of the checking device 610, and the checking recess 610*e*-2 corresponding to the checking projection 611*c*-2 is formed at the bottom of the grommet receptacle 610*c*.

As mentioned above, it is only required that the two checking projections 611*c*-1, 611*c*-2 project from the other surface of the grommet 611 other than the lip. A variety of combinations of checking projections can be formed. Further, three or more checking projections may be formed.

Figure 12A:
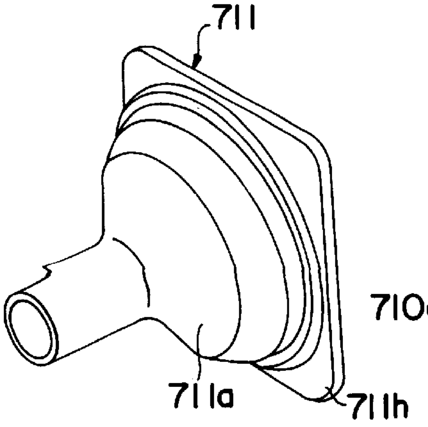
FIGS. 12(A) and 12(B) show a second embodiment, FIG. 12(A) being a perspective view of a grommet and FIG. 12(B) a section of a checking device.
Figure 12B:
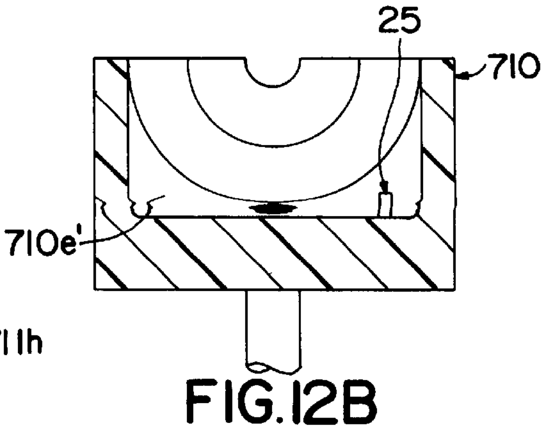
Figure 13:
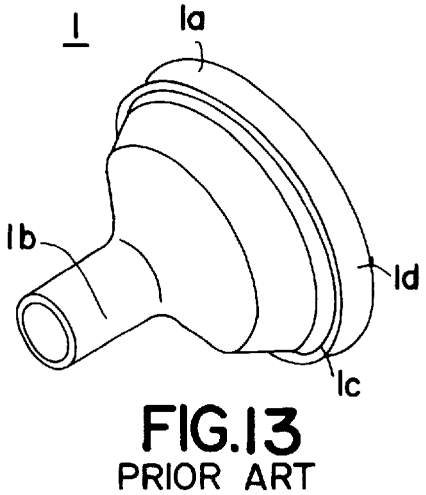
FIG. 13 is a perspective view of a prior art grommet.
Figure 14A:
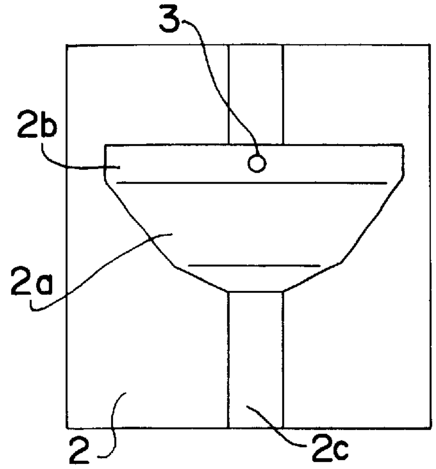
FIGS. 14(A) and 14(B) are plan and sectional views of a prior art grommet checking device.
Figure 14B:
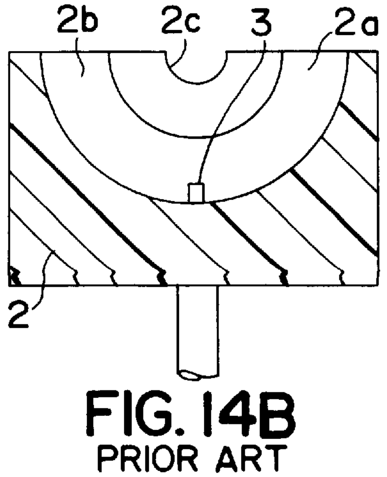
Figure 15:
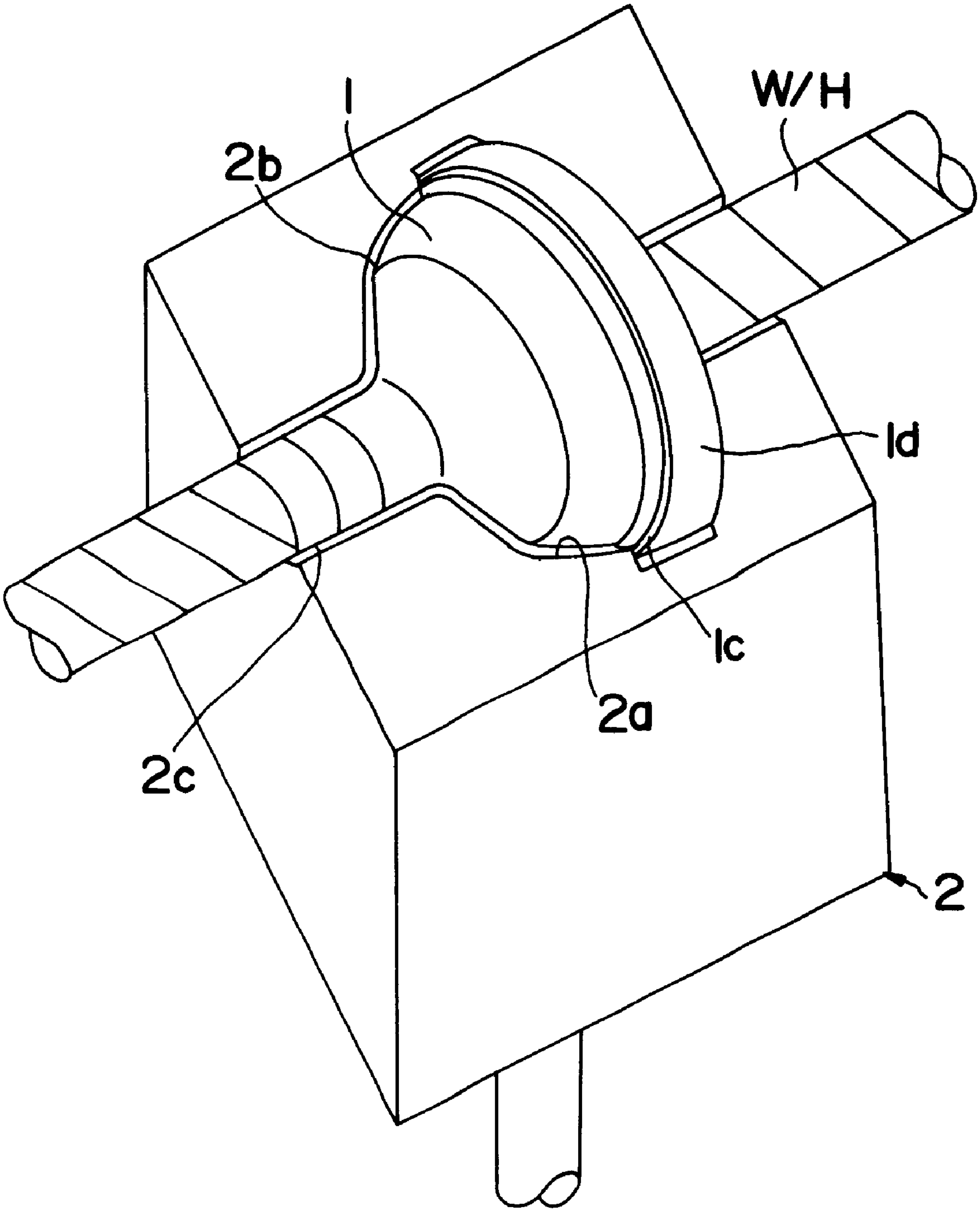
FIG. 15 is a perspective view showing a state where the grommet is fitted in the prior art checking device.
Figure 16A:
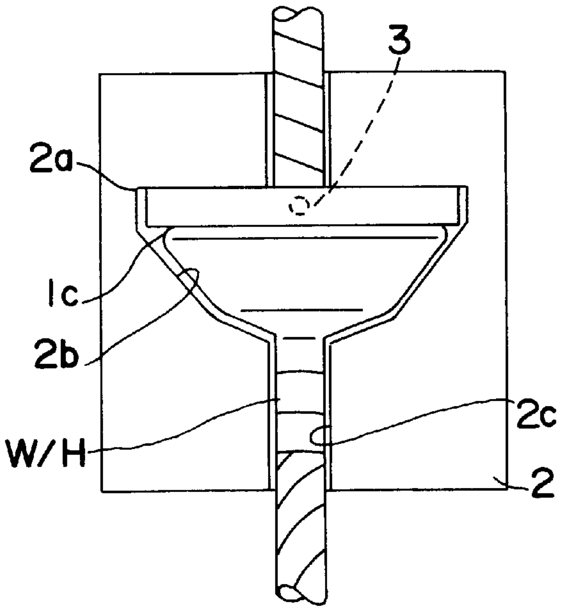
FIG. 16(A) is a plan view of FIG. 15.
Figure 16B:
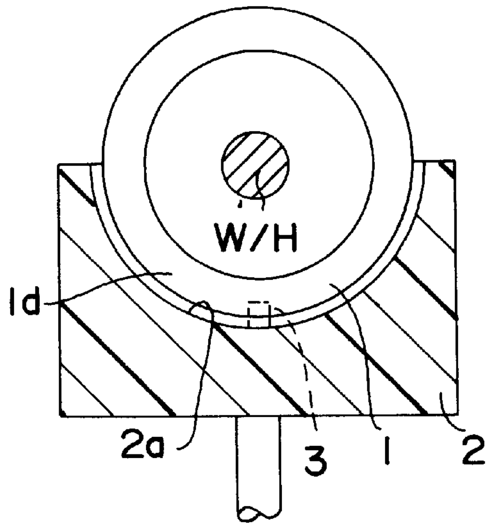
FIG. 16(B) is a section of an essential portion of FIG. 15, and FIGS. 17(A) and 17(B) are plan and sectional views showing a problem residing in the prior art checking device.
Figure 17A:
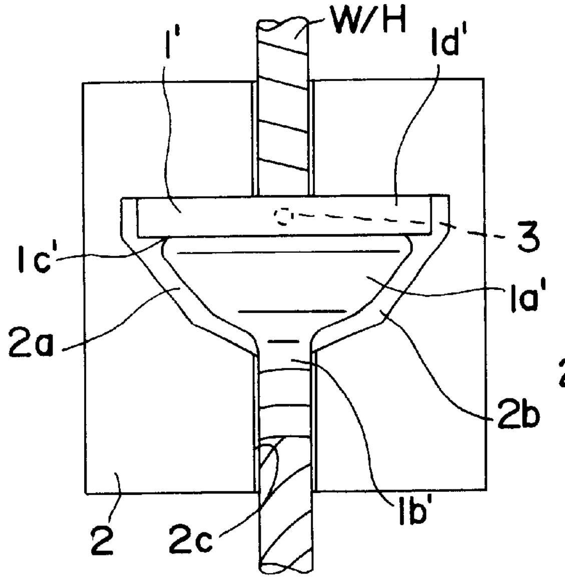
Figure 17B:
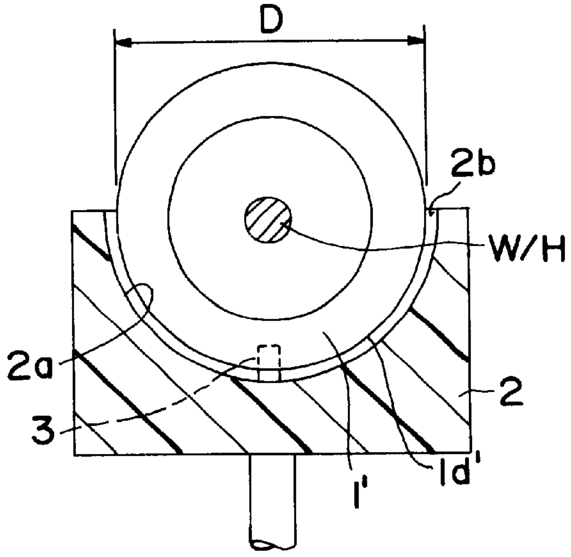

FIGS. 12(A) and 12(B) show a grommet 711 and a grommet checking device 710 according to a third embodiment. The grommet 711 is provided with a polygonal flange 711*h* projecting outward from the outer periphery of a vehicle body mount portion 711*a*. A plurality of portions of the flange 711*h* projecting from the outer periphery of the vehicle body mount portion 711*a* act as checking projections. In this embodiment, the flange 711*h* has a rectangular shape. Each checking recess 710*e*′ of the checking device 710 is formed such that its bottom end is a horizontal surface. A button 25 projecting from a detection switch 13 project into the projection recess 710*e*′ in the vicinity of a right end as shown in FIG. 12(B).

In the third embodiment, a plurality of projections are simply formed by the projected portions of the polygonal flange 711*h*. Accordingly, the shape of molds for forming the grommet 711 and the checking device 710 can be simplified, with the result that the a cost for molds can be reduced.

What is claimed is:

1. A grommet checking apparatus for identifying grommets of a specified type, each said grommet comprising a substantially tubular wire insertion portion for receiving a wiring harness therethrough and a mount portion flared outwardly and concentrically from the wire insertion portion for mounting the grommet on an external structure, the mount portion and the wire insertion portion each having outer surfaces, at least one identifying portion on the outer surface of the mount portion, the identifying portion extending outwardly from the outer surface of the mount portion of the grommet, said apparatus comprising:

- a grommet receptacle having a shape configured for closely receiving at least portions of the mount portion of the grommet therein;
- at least one identification portion dimensioned and disposed for mating with the identification portion of the grommet insertable into the grommet receptacle, the identification portion of the apparatus defining a recess in the grommet receptacle; and
- a detection switch disposed at the identification portion of the apparatus for generating an electrical signal in response to mated engagement of the identification portion of the grommet with the identification portion of the apparatus.

2. A grommet checking apparatus according to claim 1, further comprising a detection circuit connected to the detection switch for signaling mating of the identification portion of the grommet with the detection switch.

3. A grommet checking apparatus for identifying grommets of a specified type, each said grommet comprising a substantially tubular wire insertion portion for receiving a wiring harness therethrough and a mount portion flared outwardly and concentrically from the wire insertion portion for mounting the grommet on an external structure, the mount portion and the wire insertion portion each having outer surfaces, at least one identifying portion on the outer surface of the mount portion, the identifying portion of the grommet defining a recess extending into the outer surface of the mount portion of the grommet, said apparatus comprising:

- a grommet receptacle having a shape configured for closely receiving at least portions of the mount portion of the grommet therein;
- at least one identification portion dimensioned and disposed for mating with the identification portion of the grommet insertable into the grommet receptacle, the identifying portion of the apparatus comprising a projection in the grommet receptacle; and
- a detection switch disposed at the identification portion of the apparatus for generating an electrical signal in response to mated engagement of the identification portion of the grommet with the identification portion of the apparatus.

4. A grommet checking apparatus for identifying grommets of a specified type, each said grommet comprising a substantially tubular wire insertion portion for receiving a wiring harness therethrough and a mount portion flared outwardly and concentrically from the wire insertion portion for mounting the grommet on an external structure, the mount portion and the wire insertion portion each having outer surfaces, a plurality of identifying portions on the outer surface of the mount portion, said apparatus comprising:

a grommet receptacle having a shape configured for closely receiving at least portions of the mount portion of the grommet therein;

a plurality of identifying portions disposed and dimensioned such that each said identifying portion of said apparatus mates with a corresponding identifying portion of said grommet insertable into the grommet receptacle; and a detection switch disposed at the identification portion of the apparatus for generating an electrical signal in response to mated engagement of the identification portion of the grommet with the identification portion of the apparatus.

* * * * *